(12) United States Patent
Lu et al.

(10) Patent No.: US 6,233,070 B1
(45) Date of Patent: May 15, 2001

(54) OPTICAL SYSTEM AND METHOD FOR CHANGING THE LENGTHS OF OPTICAL PATHS AND THE PHASES OF LIGHT BEAMS

(75) Inventors: Yicheng Lu; Ralf-Dieter Pechstedt, both of Wantage (GB)

(73) Assignee: Bookham Technology PLC (GB)

( * ) Notice: Subject to any disclaimer, the term of this patent is extended or adjusted under 35 U.S.C. 154(b) by 0 days.

(21) Appl. No.: 09/137,399

(22) Filed: Aug. 20, 1998

(30) Foreign Application Priority Data

May 19, 1998 (GB) .................................... 9810693

(51) Int. Cl.$^7$ .............................. G02F 1/259; G02F 1/01; G02F 1/035
(52) U.S. Cl. .................. 359/9; 385/1; 385/3; 385/2; 385/4; 385/8
(58) Field of Search .................... 385/1, 2, 3, 4, 385/5, 6, 7, 8, 9

(56) References Cited

U.S. PATENT DOCUMENTS

| | | | |
|---|---|---|---|
| 4,787,691 | 11/1988 | Lorenzo et al. | 350/96.14 |
| 4,857,973 | 8/1989 | Yang et al. | 357/15 |
| 4,877,299 | 10/1989 | Lorenzo et al. | 350/96.14 |
| 4,958,898 | 9/1990 | Friedman et al. | 350/96.14 |
| 4,997,246 | 3/1991 | May et al. | 350/96.14 |
| 5,107,538 | 4/1992 | Benton et al. | 385/130 |
| 5,125,065 | 6/1992 | Stoll et al. | 385/130 |

(List continued on next page.)

FOREIGN PATENT DOCUMENTS

| | | | |
|---|---|---|---|
| 0841587 | 5/1998 | (EP) | G02F/1/225 |
| 2230616 | 10/1990 | (GB) | G02F/1/025 |
| 2302738 | 1/1997 | (GB) | G02F/1/225 |

OTHER PUBLICATIONS

Friedman, Lionel et al., "Silicon double–injection electro–optic modulator with junction gate control". *Journal of Applied Physics,* vol. 63, No. 6, Mar. 1988, pp. 1831–1839.

Giguere, Stephen R. et al., "Simulation studies of silicon electro–optic waveguide devices". *Journal of Applied Physics,* vol. 68, No. 10, Nov. 1990, pp. 4964–4970.

Schmidtchen, J. et al., "Low Loss Singlemode Optical Waveguides with Large Cross–Section in Silicon–On–Insulator". *Electronics Letters,* vol. 27, No. 16, Aug. 1991, pp. 1486–1488.

Cartledge, John C., entitled "Performance of 10 Gb/s Lightwave Systems Based on Lithium Niobate Mach–Zehnder Modulators with Asymmetric Y–Branch Waveguides", *IEEE Photonics Technology Letters,* vol. 7, No. 9, Sep. 1995, pp. 1090–1092.

(List continued on next page.)

*Primary Examiner*—Audrey Chang
(74) *Attorney, Agent, or Firm*—Webb Ziesenheim Logsdon Orkin & Hanson, P.C.

(57) ABSTRACT

An optical system comprises two optical paths $P_1$, $P_2$, and an optical path changer for changing the optical length of the two optical paths. The optical path changer includes two phase modulators $M_1$, $M_2$ one coupled to each of the paths. A driving system is configured to apply power to the phase modulators to drive them in the same direction and to change the power applied to the phase modulators in opposite directions so as to change the length of each optical path in a different direction. As a result, the relationship between the changes in the power applied to the phase modulators and the resulting changes in the phase of light beams passing through the optical system becomes substantially linear.

12 Claims, 4 Drawing Sheets

U.S. PATENT DOCUMENTS

| | | |
|---|---|---|
| 5,157,748 | 10/1992 | Mueller et al. .................... 385/41 |
| 5,566,257 | 10/1996 | Jaeger et al. ..................... 385/2 |
| 5,778,113 * | 7/1998 | Yu ................................. 385/3 |
| 6,002,816 * | 12/1999 | Penninckx et al. ................. 385/3 |

OTHER PUBLICATIONS

Hemenway, B.R. et al., entitled "A Polarization–Independent Silicon Light Intensity Modulator for 1.32 μm Fiber Optics", IEEE Photonics Technology Letters, vol. 2, No. 4, Apr. 1990, pp. 262–264.

Fischer, U. et al., entitled "Optical Waveguide Switches in Silicon Based on Ge–Indiffused Waveguides", IEEE Photonics Technology Letters, vol. 6, No. 8, Aug. 1994, pp. 978–980.

Jiang, Q. et al., entitled "Performance Comparison of Sub-carrier Multiplexed Coherent Systems Using Optical Intensity and Phase Modulators", Electronics Letters, Jan. $16^{th}$, 1992, vol. 28, No. 2, pp. 116–117.

* cited by examiner

OPTICAL SYSTEM AND METHOD FOR CHANGING THE LENGTHS OF OPTICAL PATHS AND THE PHASES OF LIGHT BEAMS

TECHNICAL FIELD

The present invention relates to an optical system including components defining two or more optical paths for the transmission of light beams and an arrangement for varying the lengths of two selected optical paths and to a method of changing the lengths of the optical paths. If light beams are transmitted along the two selected optical paths and the length of each optical path is varied, the phase of each light beam will be changed.

Such an optical system may include two optical paths of different lengths joined together in parallel. If a light beam is transmitted to one (upstream) junction of the two paths it will divide into two component beams, one of which will be transmitted along one of the parallel paths and the other of which of which will be transmitted along the other of the parallel paths. The component beams will meet at the other (downstream) junction of the two optical paths. Since the optical paths followed by the two component beams are of different lengths there will be a phase difference between the two component beams when they meet at the downstream junction. The light beams will combine and interfere with each other in a manner dependent on the size of the phase difference.

BACKGROUND ART

It is known to vary the length of an optical path in a transparent medium and thereby to change the phase of a light beam being transmitted along the path by using a device known as a phase modulator. Such a device may be an integrated electrical device such as a PIN diode that comprises heavily doped regions (n-doped and p-doped respectively) adjacent to the optical path. By passing a current through the PIN diode, carriers are injected into the transparent medium forming the adjacent portion of the optical path so that the refractive index of that portion of the optical path is changed. This change of refractive index effectively results in a change in the length of the optical path. This change in the length of the optical path results in a change in the phase of a light beam being transmitted along the optical path.

Integrated passive or active silicon-on-insulator (SOI) waveguides forming optical paths have very broad applications. Active integrated optical elements coupled to the waveguides may be based on phase modulators, such as the PIN diode modulators described above. Many integrated optical devices such as interferometers, switches and amplitude attenuators can be made from this integrated phase modulator structure. When a phase modulator is coupled to one of the optical paths of an optical system as above having two optical paths the difference between the path lengths of the two optical paths can be varied. The nature of the interference between the two light beams will therefore be varied.

Most phase modulators, such as the PIN diode phase modulator described above, require the use of a current driver. Due to the nature of the current response in most phase modulators the change in the optical path length and the phase change is a non-linear function of the driving current. In addition, due to the scattering of the light by the carriers injected into the material of the optical path, a light beam transmitted through the portion of an optical path which is coupled to a phase modulator including a PIN diode also undergoes amplitude modulation.

Another type of phase modulator is a thermal phase modulator. In this type of modulator a voltage is applied to heating or cooling means change the temperature of the material so that the phase of a light beam being transmitted along the path is varied. As for the above-described PIN diode type of phase modulator, the change in phase is a non-linear function of the voltage applied.

Integrated optical systems that include phase modulators are, for example, used in sensor applications, where the sensor system depends on the phase modulator to demodulate or process the signal. Any non-linearity of the phase modulator is thus reproduced in the sensor system output. Therefore, the non-linearity of prior art phase modulators directly affects the accuracy of the sensor system. Complicated linearization circuits have therefore been necessary in prior art systems to compensate for this deficiency.

Because of the nature of some phase modulators, such as the PIN diode phase modulator described above, the driving current always flows through the modulator in only one direction. Therefore, these phase modulators can only be driven in one direction and a standard push pull method of operation in which current can be made to flow through the phase modulator in either of two directions is generally not possible to implement. Active optical systems such as interferometers and switches comprise two optical paths and a phase modulator is used in one of the paths to change the Optical Path Difference (OPD) between the two paths and thus change the optical properties of the system. The phase modulator can be coupled to either optical path for generating a similar effect on the OPD change of the system. Therefore, it is customary to use only one phase modulator in such interferometers or switches.

A second phase modulator can be added into the other optical path of the system. Nevertheless, due to the nature of a phase modulator, each phase modulator generates a similar effect on its associated optical path, i.e. it makes the path length shorter when the driving current is increased and makes the path length longer when the driving current is decreased. As a result, in known systems, the path changes resulting from the phase modulators substantially counteract each other. Therefore, in prior art optical systems where a second phase modulator has been used, it has generally been used as a backup phase modulator in series with the first phase modulator and in the same optical path.

The object of the present invention is to provide an optical system including components defining two or more optical paths for the transmission of light beams and having an improved arrangement for varying the lengths of the optical paths so as to change the phases of light beams transmitted along the optical paths.

DISCLOSURE OF THE INVENTION

According to one aspect of the invention an optical system comprises components defining at least two optical paths and an arrangement for changing the length of two selected optical paths including two phase modulators, one coupled to each of the selected optical paths, and a driving system for applying power to the phase modulators to drive them in the same direction and for changing the amounts of power applied to the phase modulators in opposite directions so as to change the length of each optical path in a different direction.

The changes in opposite directions of the amounts of power applied to the phase modulators are preferably equal.

The amounts of power applied to the phase modulators may be changed simultaneously or in succession.

According to another aspect of the invention there is provided a method of changing the lengths of two optical paths, each path comprising a phase modulator, the method comprising the steps of: applying power to the two phase modulators so as to drive the phase modulators in the same direction, and changing the amounts of power applied to the phase modulators in opposite directions so as to change the length of each optical path in a different direction.

If a light beam is transmitted along each selected optical path when the length of each optical path has been changed, each light beam will undergo a phase change. Normally the relationship between the change in amount of power applied to a phase modulator coupled to an optical path and the resultant change in the phase of a light beam transmitted along the optical path is non-linear. By combining together the phase changes in the light beams using the above arrangement of phase modulators and arrangement for applying power to the phase modulators the non-linearity is substantially cancelled. As a result, the relationship between the changes in the amounts of power applied to the phase modulators and the resulting changes in the phases of the light beams becomes substantially linear.

The optical paths along which the light beams are transmitted can be the same length or can be of different lengths in the absence of any power applied to any of the phase modulators. In the latter case they are said to have an initial Optical Path Difference ($OPD_o$).

In an optical system in accordance with the invention in which the optical paths have a non-zero $OPD_o$, the OPD of the system can be changed by using the above technique of increasing the power applied to one phase modulator while decreasing the power applied to the other phase modulator. The two phase modulators will produce an opposite effect on the OPD of the system, and these effects will be added together to produce an overall OPD change. This will double the change of the overall OPD, and therefore the overall phase change, for a given power change range, or, alternatively, the power change range will be reduced to one half for a required OPD change, as long as the power change induced OPD change does not exceed $OPD_0$.

Since the amounts of power applied to the two phase modulators are changed in opposite directions the length of the optical path coupled to one of the phase modulators will be increased and the length of the optical path coupled to the other phase modulator will be decreased. The phase changes in the two light beams will therefore be added together, if the two light beams are subsequently combined, for example in an interferometer. Any non-linearity between the changes in the amount of power applied to each phase modulator and the corresponding changes in the phase of the light beam transmitted in the optical path to which the phase modulator is coupled will be substantially cancelled out by adding together the phase changes in the two light beams.

Any amplitude modulation which occurs in the light beams by the operation of the phase modulator will be reduced by the arrangement of changing the phases in the light beams in opposite directions.

The phase modulators referred to above may be of the type which include PIN diodes. In this arrangement, the current applied to the PIN diodes is changed in order to change the lengths of the optical paths.

Alternatively, the phase modulators may be of the type known as thermal phase modulators. In this arrangement, the voltages applied to the modulators are changed in order to change the lengths of the optical paths.

In a preferred arrangement of the invention in which the phase modulators are the PIN diode type described above, before the currents in the two phase modulators are changed, the initial current flowing in the first phase modulator is zero and the initial current flowing in the second phase modulator is at a selected maximum value. To cause phase changes in the light beams being transmitted along the optical paths coupled to the phase modulators, the current in the first phase modulator is increased by a selected amount and the current in the second phase modulator is decreased by the same selected amount. This increase and decrease can take place simultaneously or in succession. In either case, the required overall phase change between the light beams occurs when the two current changes in opposite directions have taken place. If the light beams are combined after the phase changes have taken place the overall phase change will be sum of the phase changes in the light beams. As a result, the overall phase change for a given current change will be doubled.

It will be appreciated that the current in the phase modulator having an initial current other than zero cannot be reduced below the value of the initial current.

Since, in the optical system and power application arrangement described above the two phase modulators are always driven in opposite directions in terms of power change, this arrangement is said to be operated in a push pull manner even though the driving of both of the phase modulators is in fact uni-directional. The arrangement described is therefore termed a "pseudo push-pull" power application arrangement. By using this the overall accuracy of the optical system, e.g. in a sensor application, is significantly increased.

BRIEF DESCRIPTION OF THE DRAWINGS

In order that the invention may be more readily understood an embodiment of the invention will now be described, merely by pay of example, with reference to the accompanying drawings in which.

BEST MODE OF CARRYING OUT THE INVENTION

Figure 1:
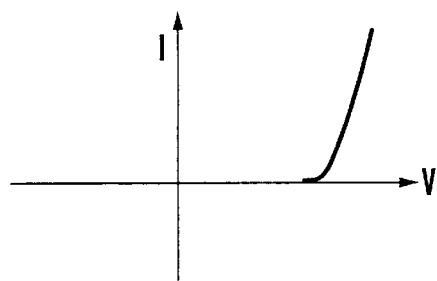
FIG. 1 is the schematic current-voltage (I/V) characteristic of a PIN diode phase modulator.

With reference to FIG. 1 this illustrates that, above a threshold applied voltage V, a current I will flow through a PIN diode phase modulator. The diode can only be forward biased to inject current into the optical path and thus change the free carrier density. The refractive index change Δn in the optical path is a function of the carrier density (which is changed by the driving current) and the wavelength of the light beam transmitted along the optical path. The change of optical path length ΔL is proportional to the change of refractive index Δn and the length L of the optical path in the phase modulator.

$$\Delta L = \Delta n * L \qquad (1)$$

It should be noted that the Δn is negative with respect to current change ΔI.

Since most active optical systems including phase modulators are based on the principle of interference, an interferometer is taken as an example for the following description.

A specific embodiment of the invention to be described is based on an active optical system involving two optical paths. The optical paths initially have different lengths, i.e. $OPD_0$ is non-zero. There are at least two PIN diode phase modulators included in the system.

Figure 2:
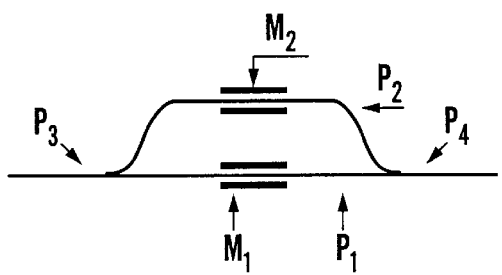
FIG. 2 is a schematic diagram of a Mach-Zehnder interferometer including two phase modulators driven by a power driving arrangement in accordance with the invention.

With reference to FIG. 2 the Mach-Zehnder interferometer illustrated is the simplest case of an embodiment comprising two optical paths $P_1$, $P_2$ connected in parallel. The two optical paths have different lengths $L_1$, $L_2$ and each path includes a phase modulator $M_1$, $M_2$ for changing the values of $L_1$, $L_2$. An input optical path $P_3$ is connected to one junction of the paths $P_1$, $P_2$ and an output optical path $P_4$ is connected to the other junction of the optical paths $P_1$, $P_2$. The output (intensity) of the light beam in the output optical path $P_4$ is of the general form:

$$A + B * COS(\Phi_d) \qquad (2)$$

where $\Phi_d$ is the optical phase difference $\Phi_d = 2\pi * OPD/\lambda$, between the portions of the light beam in the paths $P_1$, $P_2$, where λ is the wavelength and $$OPD = ABS(L_1 - L_2) = ABS(OPD_0 + \Delta L_1 - \Delta L_2) \qquad (3)$$

where $OPD_0$ is the initial OPD of the system, i.e. in the absence of any current, and $\Delta L_1$ and $\Delta L_2$ are the changes in the lengths of the paths $P_1$ and $P_2$.

Similarly, the OPD change with driving current is:

$$\Delta OPD = ABS(OPD_0 + \Delta L_1 - \Delta L_2) - OPD_0 \qquad (4)$$

where ABS( . . . ) refers to the modulus of absolute value of its argument.

Figure 3:
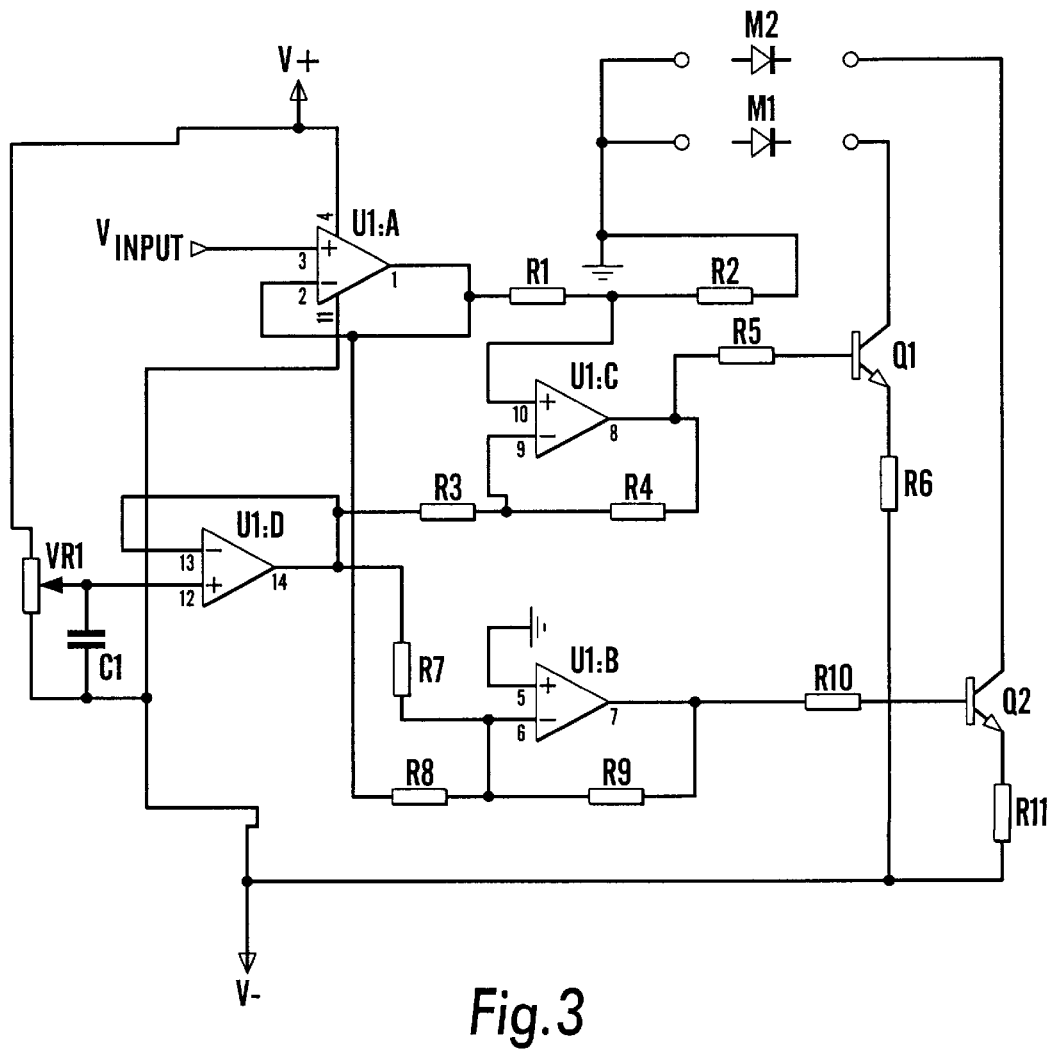
FIG. 3 is a schematic circuit diagram of a power driving arrangement for the phase modulators according to the invention illustrated in FIG. 2.

From the expression (4) it can be seen that when the two phase modulators are simply driven in parallel and $\Delta L_1$ is equal to $\Delta L_2$, this produces a zero (or close to zero) OPD change and therefore this method cannot be used to obtain the desired result. However, when the driving currents through the two phase modulators are changed in opposite directions in a pseudo push pull manner as described below with reference to FIG. 4, $\Delta L_1$ changes in the opposite direction to $\Delta L_2$, and by an equal amount, i.e. $\Delta L_1 = -\Delta L_2$, and therefore the OPD change is:

$$\Delta OPD_{max} - \Delta OPD_{min} = 2 * ABS(\Delta L_{1,max}) = 2 * ABS(\Delta L_{2,max}) \qquad (5)$$

Where $\Delta OPD_{max} = \Delta L_{1,max}$ and $\Delta OPD_{min} = -\Delta L_{2,max}$ The schematic circuit diagram of the current driving system illustrated in FIG. 3 has been devised to drive the phase modulators $M_1$, $M_2$ in a pseudo push pull way. Unlike a general push pull driving system which is used to drive one load (device) with different current directions, the driving system illustrated is designed for driving two phase modulators having the same current directions and to change the currents in the phase modulators. Because of the nature of PIN diode phase modulators, the driving current for each modulator cannot be reversed. More specifically, the driving system is designed so that the direction of the current change in one phase modulator is opposite to the direction of the current change in the other modulator. In the driving system shown, the operational amplifier U1:D is used for setting the mid level position. At this position, both phase modulators have the same driving current. This setting also defines the maximum working range $I_m$ which is a constant. Operational amplifier U1:A is used as a buffer for the voltage signal input $V_{input}$. The pseudo push pull effect is realised by operational amplifiers U1:B and U1:C. When the input voltage $V_{input}$ increases, the output of U1:C increases at the same rate as the output of U1:B decreases. The transistors Q1 and Q2 form the basis of a current driver, which generates a driving current proportional to the input voltage $V_{input}$.

Although operational amplifiers U1:A to U1:D may be four individual operational amplifiers, in the arrangement illustrated in FIG. 3 all four amplifiers are preferably formed on one chip. This will generate more stable and more symmetric results for the input/output of the driving system and will reduce the space required for the driving system. It also reduces level of radiation generated as the circuit is driven at constant load.

In a preferred embodiment of the pseudo push-pull method for driving the optical system illustrated in FIG. 2 with the driving system illustrated in FIG. 3, currents $I_1 = 0$ and $I_2 = I_m$ are initially applied to the phase modulators $M_1$, $M_2$ in the first and the second paths $P_1$, $P_2$ of the system, respectively. Subsequently, by means of the driving system of FIG. 3 the current $I_1$ in phase modulator $M_1$ is increased by a desired value and the current $I_2$ in phase modulator $M_2$ is decreased by the same value so that the current $I_2$ in the other phase modulator $M_2$ always fulfills the relationship $I_2 = I_m - I_1$. Alternatively, this process could equally be started from a different initial current ratio $I_1/I_2$, but it always includes a fixed current constant $I_m$.

Figure 4:
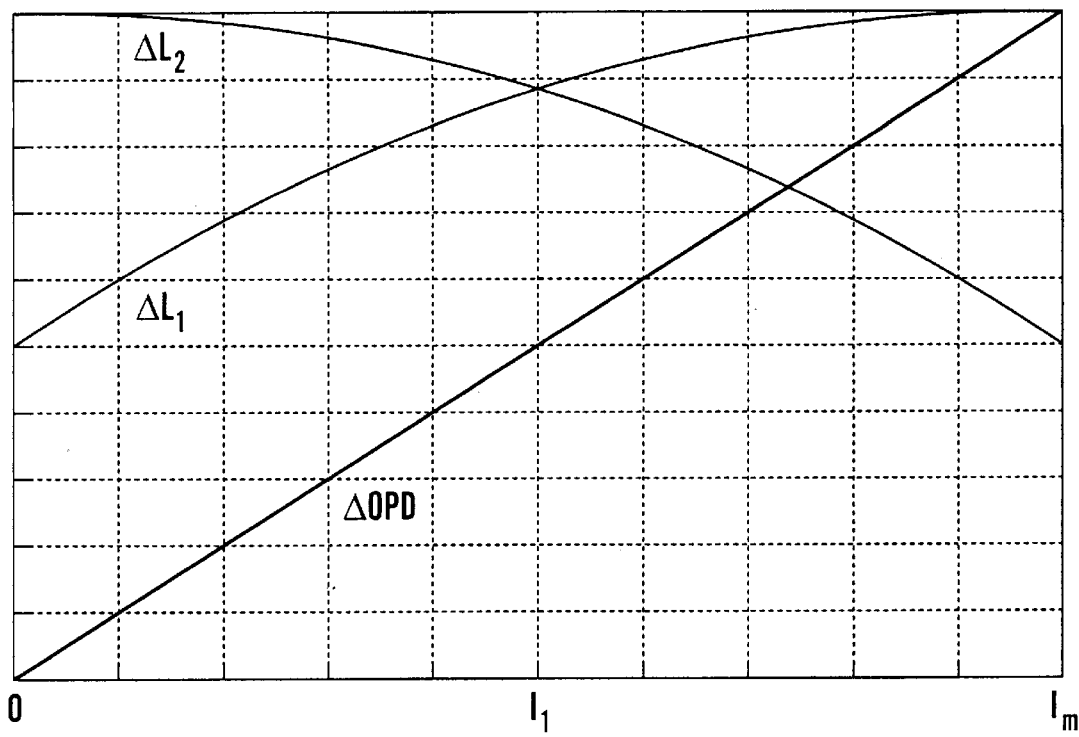
FIG. 4 illustrates the phase modulation resulting from use of the two phase modulators according to the invention illustrated in FIG. 2.

FIG. 4 shows the calculated result for the current-path length change characteristic achieved by using the optical system and the pseudo push pull driving system described above for changing the currents in the two phase modulators $M_1$, $M_2$. The graph in FIG. 4 shows the changes in path length $\Delta L_1$ and $\Delta L_2$ of the individual optical paths and the combined path length change ΔOPD produced thereby depending on the driving current. The result demonstrates that the overall path length change for light beams associated with the two phase modulators achieved by means of a pseudo push-pull driving system is perfectly linear even though the path length change caused by each phase modulator is highly non-linear relative to the driving current. This can be demonstrated by analytical calculation. When the driving current $I_1$ for phase modulator $M_1$ changes from $I_1 = 0$ to a maximum current $I_1 = I_m$, the current in phase modulator $M_2$ will change from $I_2 = I_m$ to $I_2 = 0$ according to the pseudo push-pull principle.

The graph shows $I_1$ increasing from zero to $I_m$ while $I_2$ decreases from $I_m$ to zero. During these current changes, $L_1$ increases (by $\Delta L_1$) and $L_2$ decreases (by $\Delta L_2$) as illustrated. The OPD changes from an initial value $OPD_0 - \Delta L_2$ to $OPD_0 + \Delta L_1$ as illustrated.

Suppose the relationship between path length change, $\Delta L_1$ and current $I_1$ in modulator $M_1$ is parabolic, i.e.

$$\Delta L_1 = a + b * I_1 + c * I_1^2 \qquad (6)$$

where a, b & c are constant coefficients and their values depend on the characteristics of the phase modulator. Coefficient a must be zero because path length change $\Delta L_1$ is zero when the current $I_1$ equals zero. At the same time, the path length change $\Delta L_2$ and the current $I_2$ in modulator $M_2$ will satisfy the following equation:

$$\Delta L_2 = a + b*I_2 + c*I_2^2 \qquad (7)$$

Due to the pseudo push pull arrangement, $I_2 = I_m - I_1$. Here $I_m$ is a constant value that depends on the circuit adjustment. It usually equals the maximum driving current for each phase modulator. Thus, we have $$\Delta L_2 = a + b*(I_m - I_1) + c*(I_m - I_1)^2. \qquad (8)$$

The total OPD change for the system is:

$$\Delta OPD = \Delta L_1 - \Delta L_2 = -(b*I_m + c*I_m^2) + 2(b + c*I_m)*I_1. \qquad (9)$$

This is linear with variation in current $I_1$. As a result the phase change resulting from the pseudo push pull driving system is also perfectly linear with driving current (as shown in FIG. 4).

From equation 9, we can easily get the maximum OPD change when the driving current changes from 0 to $I_m$.

$$\Delta OPD_{min} = -(b*I_m + c*I_m^2) = -\Delta L_{1,max} \text{ when } I_1 = 0, \Delta OPD_{max} = b*I_m + c*I_m^2 = -\Delta L_{1,max} \text{ when } I_1 = I_m \qquad (10)$$

and thus the maximum phase change is:

$$\Delta \Phi_{d,max} = \Phi_{d,max} - \Phi_{d,min} = 2*\Delta \Phi_{1,max} = 2*\Delta \Phi_{2,max} = 2\pi*2\Delta L_{1,max}/\lambda, = 2\pi*2\Delta L_{2,max}/\lambda, \qquad (11)$$

This indicates that the maximum phase change for a pseudo push pull driving system driving the two phase modulators doubles the maximum range of a system comprising only one phase modulator.

Figure 5:
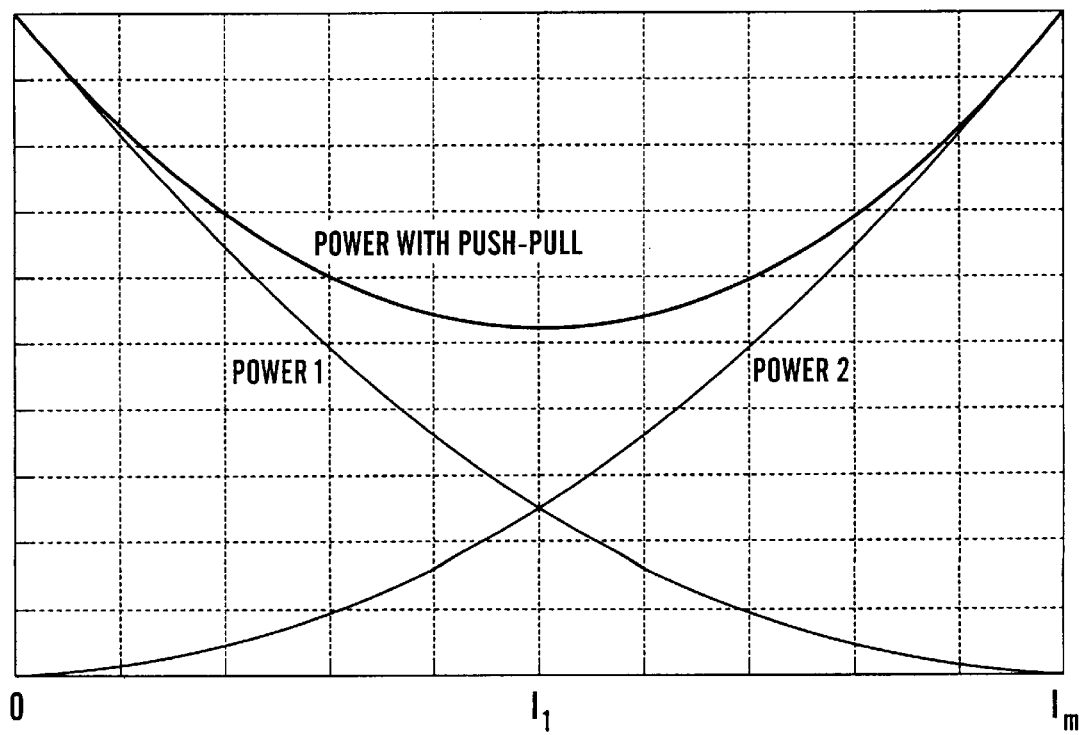
FIG. 5 illustrates the amplitude modulation resulting from use of the two phase modulators according to the invention illustrated in FIG. 2.

Similarly, the amplitude modulation can be calculated and is illustrated in FIG. 5. In FIG. 5 all graphs shown are normalised to a power ratio of 1 at their maximum. As described above, the phase modulation of the light beam associated with a phase modulator results from the current injection into the optical path. When current is injected into the optical path, the carriers react with photons inside the waveguide forming the optical path and cause light scattering, which introduces some light intensity loss or amplitude modulation to the optical system. The amplitude modulation is a side effect of phase modulation and should be reduced whenever possible. Generally, the important measure for amplitude modulation is the ratio of the amplitude for a given driving current (or a given phase) to the maximum amplitude. The amplitude modulation resulting from the use of two phase modulators controlled by means of a pseudo push-pull driving system is more complicated than the phase modulation, and therefore the calculation (illustrated in FIG. 5) is based on data that closely approximates the properties of a real phase modulator. The curve labelled Power 1 shows the amplitude modulation if only the first modulator is driven, the curve labelled Power 2 shows the amplitude modulation if only the second modulator is driven and the curve labelled Power with Push-pull shows the amplitude modulation when the two modulators are driven using the pseudo push-pull technique. The Figure shows that the pseudo push-pull driving system generates a smaller amplitude modulation.

Figure 6:
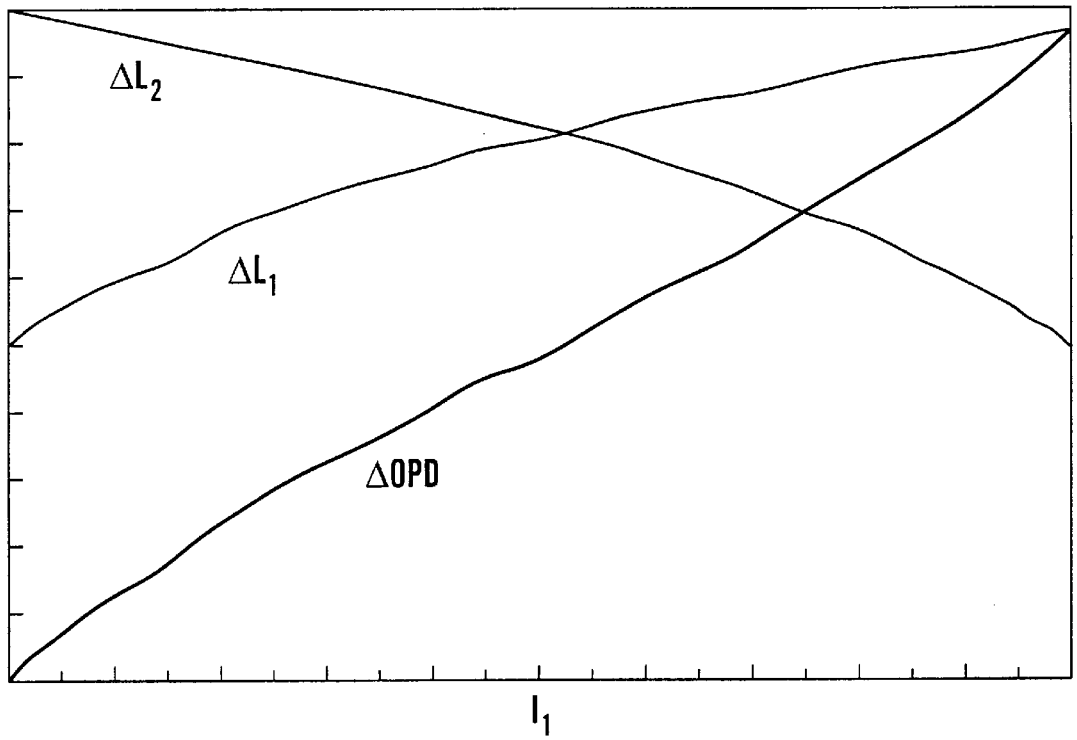
FIG. 6 illustrates the phase modulation according to the invention measured in tests.
Figure 7:
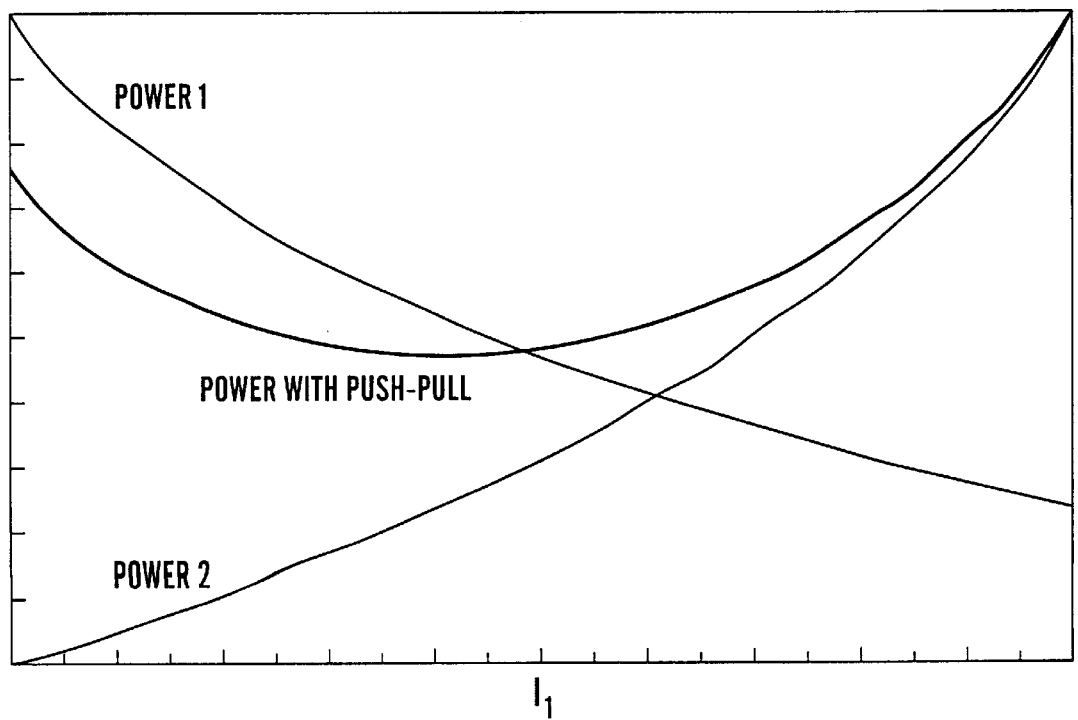
FIG. 7 illustrates the amplitude modulation according to the invention measured in tests.

The calculations above are verified by experimental results. FIG. 6 shows the test results for phase modulation and FIG. 7 illustrates those for amplitude modulation.

The results of using the combination of an optical system with two phase modulators and the pseudo push pull driving system for controlling the phase modulators as described above for phase and amplitude modulation can be summarised as follows:

The total phase change is the phase sum of the phase changes resulting from the two phase modulators.

The phase change linearity is greatly improved though it is not purely linear due to the deviation from a pure parabolic response of the phase changes resulting from a single modulator. Generally, it is about one order of magnitude better or smaller from the standpoint of phase change linearity.

The optical system described can be used in active silicon on insulator (SOI) optical devices involving two optical paths and working on the principle of interference, such as switches or amplitude attenuators. It can also be used in interferometers, e.g. used to demodulate or process signals from a sensor. Optical interferometry is a widely used technique for high accuracy measurement. For these applications, the system accuracy depends on phase modulator performance. Improving linearity or reducing amplitude modulation make it possible to achieve higher accuracy.

The advantages described above lead to the following results in applications:

Applications are possible which require a large phase change range such as in interferometer sensors.

For a fixed phase change range, less (about half) the driving current change is required. For a switch, this means the pulse current to switch on/off is halved, which makes it easier to increase the driving speed and reduces the noise interference to other circuits.

The current drawn from the power supply by the pseudo push pull control system is constant, no matter what the state of the optical system is, when an electrical driving circuit as described above is used. The control device described, therefore, reduces the electrical radiation from the system and so enables the drive circuit to be packaged with the remainder of the device.

As an alternative to the PIN diode phase modulators the pseudo push pull driving system described above can be used with thermal phase modulators. With a thermal phase modulator, the phase change in a light beam transmitted along an optical path to which the thermal phase modulator is connected is related to the thermal power applied to the optical path. As the thermal power is proportional to the square of the current the phase modulation is of the general form $a*I^2$, i.e. it has a parabolic shape. This indicates that the phase change is highly non-linear with current especially when the current is large. However, if an optical system (e.g. interferometer) uses two thermal phase modulators with the pseudo push pull driving system described above, the large non-linearity of a single phase modulator will be effectively removed and a linear current response will be generated.

Figure 8:
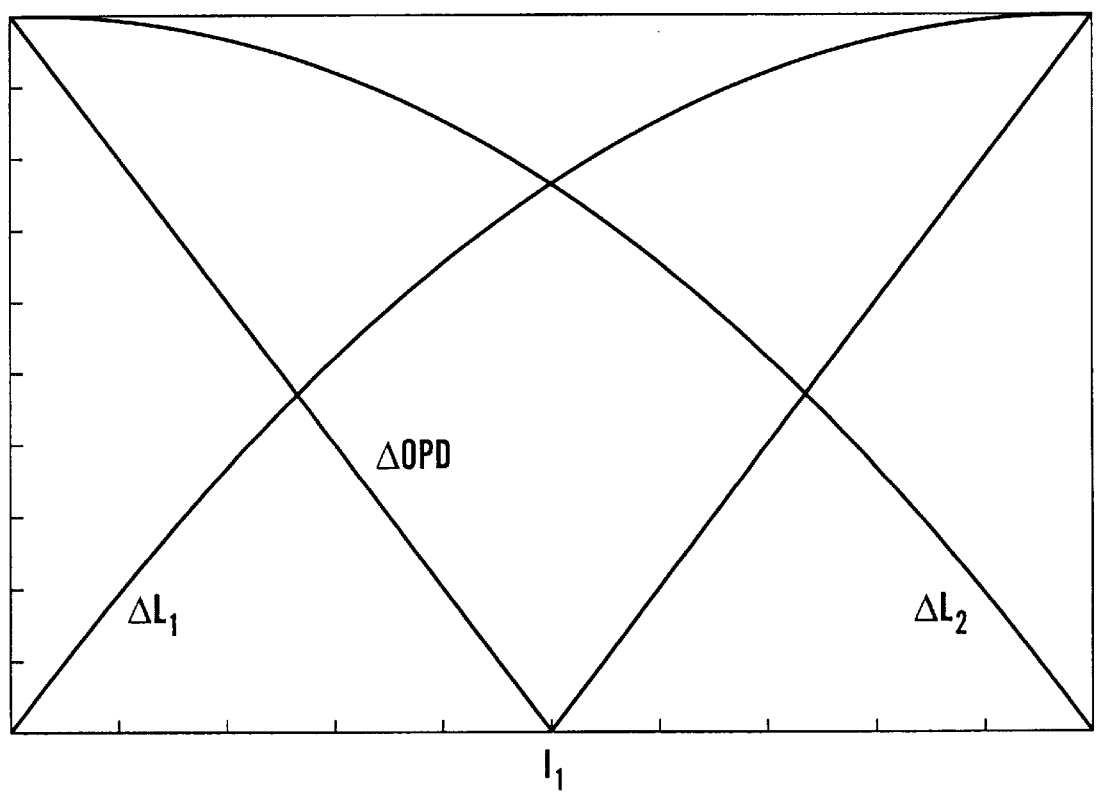
FIG. 8 illustrates the phase modulation resulting from the use of the two phase modulators according to the invention illustrated in FIG. 2 in two optical paths which do not have an initial optical path difference.

It should also be noted that, despite the preferred embodiment of the invention described above, the invention can also be used in conjunction with active optical devices without an initial OPD (i.e. $OPD_0 = 0$). The major difference in this case is that the phase change range that one can sweep through using the method and device will be the same as the range of either phase modulator rather than the sum of the ranges of the two phase modulators, according to equation 4 (see FIG. 8). Apart from this constraint, however, all other advantages of the invention are still realised in this arrangement, such as the non-linearity improvement, effective amplitude modulation reduction, constant driving load on the power supply, and less required current change (halved) for a given phase range.

As indicated above, the optical system is preferably fabricated on a silicon-on-insulator (SOI) chip, although the described system and driving method are applicable to other forms of device.

The optical pathways are preferably rib waveguides formed in the upper silicon layer of the SOI chip and the PIN diode modulators are preferably formed across portions of a rib waveguide. Further details of such waveguides and such PIN diodes are given in U.S. Pat. No. 5,757,986 to Crampton et al., the disclosure of which is incorporated herein by reference thereto.

What is claimed is:

1. An optical system comprising:
   a silicon-on-insulator chip having integrated rib waveguides defining at least two optical paths, with two phase modulators formed on the rib waveguides, each of the phase modulators being of a type in which a change in path length produced thereby is a non-linear function of the power or voltage applied thereto, each phase modulator being coupled to one of the at least two optical paths; and
   a driving system configured to apply voltage or power to the respective phase modulators to drive them so current flows through each phase modulator in one direction and for increasing the voltage or power applied to one of the phase modulators whereby the amount of current therethrough increases and for decreasing the voltage or power applied to the other phase modulator whereby the amount of current therethrough decreases, wherein the resultant phase changes in the two optical paths are combined so that an effect of non-linearity of phase changes in the individual paths in response to changing the voltage or power applied thereto is avoided.

2. The optical system as claimed in claim 1 wherein, the driving system comprises a power changer for changing in opposite directions the amounts of power applied to the modulators by equal amounts.

3. The optical system as claimed in claim 1 wherein, said driving system comprises a power changer for changing the amounts of power applied to the phase modulators simultaneously.

4. The optical system as claimed in claim 1 wherein, the two optical paths have an initial optical path difference length which is non-zero.

5. The optical system as claimed in claim 1 where:
   the phase modulators comprise PIN diodes;
   the driving system supplies currents to the PIN diodes; and
   the driving system includes a current changer for changing the currents in order to change the lengths of the optical paths.

6. The optical system as claimed in claim 1 wherein:
   the phase modulators comprise thermal phase modulators;
   the driving system supplies voltages to the phase modulators; and
   the driving system includes a voltage changer for changing the voltages in order to change the lengths of the optical paths.

7. The optical system as claimed in claim 1 wherein:
   the driving system comprises a driving circuit which includes operational amplifiers configured such that when an input voltage is applied to the driving circuit, the output of one operational amplifier increases at the same rate as the output of another operational amplifier decreases.

8. The optical system as claimed in claim 7 wherein, the driving circuit is configured to supply a constant current during its operation.

9. The optical system as claimed in claim 7 wherein, all the operational amplifiers are provided on one integrated circuit.

10. The optical system as claimed in claim 1 wherein the optical system forms part of a Mach-Zehnder interferometer.

11. A method of changing the lengths of two optical paths formed by rib waveguides on a silicon-on-insulator chip, each path comprising a phase modulator formed on the respective rib waveguide, each of the phase modulators being of a type in which the change in path length produced thereby is a non-linear function of the driving current or voltage applied thereto, the method comprising the steps of:
   a) applying a voltage or power to the two phase modulators so current flows through each phase modulator in one direction;
   b) increasing the voltage or power applied to one phase modulator whereby the amount of current flowing therethrough increases;
   c) decreasing the voltage or power applied to the other phase modulator whereby the amount of current flowing therethrough decreases, wherein in response to increasing the voltage or power applied to the one phase modulator and decreasing the voltage or power applied to the other phase modulator, the length of the corresponding optical paths change in different directions; and
   d) combining the resultant phase changes in the two optical paths so that the effect of non-linearity of the phase changes in the individual paths in response to the voltage or power applied thereto is avoided.

12. The method as claimed in claim 11, wherein the voltage or power in step (b) is increased by the same amount as the voltage or power in step (c) is decreased.

* * * * *

UNITED STATES PATENT AND TRADEMARK OFFICE
CERTIFICATE OF CORRECTION

| | |
|---|---|
| PATENT NO. | : 6,233,070 B1 |
| APPLICATION NO. | : 09/137399 |
| DATED | : May 15, 2001 |
| INVENTOR(S) | : Yicheng Lu et al. |

Page 1 of 1

It is certified that error appears in the above-identified patent and that said Letters Patent is hereby corrected as shown below:

Column 4 Line 37 "by pay of" should read --by way of--.

Signed and Sealed this

Twenty-eighth Day of November, 2006

JON W. DUDAS
*Director of the United States Patent and Trademark Office*